(12) United States Patent
Poe et al.

(10) Patent No.: US 7,785,517 B2
(45) Date of Patent: Aug. 31, 2010

(54) METHODS FOR REDUCING OR ELIMINATING DEFECTS IN POLYMER WORKPIECES

(75) Inventors: Garrett D. Poe, Madison, AL (US); Brian G. Patrick, Madison, AL (US)

(73) Assignee: NeXolve Corporation, Huntsville, AL (US)

( * ) Notice: Subject to any disclaimer, the term of this patent is extended or adjusted under 35 U.S.C. 154(b) by 134 days.

(21) Appl. No.: 11/844,859

(22) Filed: Aug. 24, 2007

(65) Prior Publication Data

US 2009/0054615 A1    Feb. 26, 2009

(51) Int. Cl.
- B29C 71/00    (2006.01)
- B28B 11/08    (2006.01)
- H05B 6/00    (2006.01)
- A01J 25/12    (2006.01)
- A01J 21/00    (2006.01)
- A21C 3/00    (2006.01)

(52) U.S. Cl. .............. 264/291; 264/232; 264/235; 425/383; 425/403.1; 425/445; 425/446; 528/170; 248/576; 248/603

(58) Field of Classification Search .......... 264/232, 264/235, 479, 291, 292; 528/170; 425/383, 425/403.1, 445, 446; 248/576, 603
See application file for complete search history.

(56) References Cited

U.S. PATENT DOCUMENTS

| | | | |
|---|---|---|---|
| 2,918,696 A | 12/1959 | Bottoms | |
| 2,933,759 A | 4/1960 | Startzell | |
| RE024,978 E | 5/1961 | Bottoms | |
| 5,207,963 A | 5/1993 | Grace | |
| 5,321,109 A | 6/1994 | Bosse | |
| 5,468,138 A | 11/1995 | Bosse | |
| 5,512,229 A * | 4/1996 | Bosse et al. | 264/161 |
| 5,552,006 A | 9/1996 | Soliday | |
| 6,808,665 B1 | 10/2004 | Percival | |
| 2004/0126600 A1* | 7/2004 | Dunbar et al. | 428/473.5 |
| 2005/0053789 A1* | 3/2005 | Percival | 428/413 |
| 2005/0153209 A1* | 7/2005 | Vallee et al. | 429/314 |

* cited by examiner

Primary Examiner—Matthew J Daniels
Assistant Examiner—Atul Khare
(74) Attorney, Agent, or Firm—Bradley Arant Boult Cummings, LLP; T. Gregory Peterson; Nicholas J. Landau

(57) ABSTRACT

The present disclosure provides novel methods of producing a composition, such as, but not limited to, a polyimide composition. The methods in their most general form comprise providing a workpiece, suspending the workpiece and subjecting the suspended workpiece to processing such that the workpiece undergoes a transformation from a first state to a second state. By maintaining the workpiece in a suspended state during processing, processing-related defects are reduced or eliminated. Using such methods, the present disclosure provides compositions that are have no or reduced processing-related defects. In addition, the compositions are more consistent in chemical and physical properties and are cheaper and more economical to produce (since less product is rejected as unsuitable).

25 Claims, 1 Drawing Sheet

METHODS FOR REDUCING OR ELIMINATING DEFECTS IN POLYMER WORKPIECES

FIELD OF THE DISCLOSURE

The present disclosure relates generally to devices for reducing or eliminating defects in workpieces and/or compositions, such as polymer workpieces and/or compositions, including, but not limited to, polyimide workpieces and/or compositions.

BACKGROUND

The art is aware that a number of commercially useful compositions are used to produce various workpieces by inducing a transformation in the composition at some point in the production of workpiece for use. In many cases, such a transformation involves subjecting the composition/workpiece to conditions that can cause processing-related defects in the composition and/or the workpiece produced. If the manufacturing process is not properly controlled, such processing-related defects can prevent the workpiece from being economically or effectively produced and/or can introduce defects into the workpiece. This is especially true in the field of chemical compositions, where the transformation steps often involve removal of significant amounts of solvent and/or changes that induce conformational changes in the composition during the transformation. Poly(amic acid) and polyimide compositions are exemplary of this phenomenon. The workpiece can take on a variety of forms, such as a film, membrane or three-dimensional shape.

Polyimides are an important class of polymeric materials and are known for their superior performance characteristics. Most polyimides are comprised of relatively rigid molecular structures with aromatic/cyclic moieties and exhibit high glass transition temperatures, good mechanical strength, high Young's modulus, and excellent thermo-oxidative stability. Furthermore, the linearity and stiffness of the cyclic/aromatic backbone reduce segmental rotation and allow for molecular ordering which results in lower coefficients of thermal expansion (CTE) than those thermoplastic polymers having more flexible chains. In addition, the intermolecular associations of polyimide chains provide resistance to most solvents.

As a result of their favorable characteristics, polyimide compositions have become widely used in the aerospace industry, the electronics industry and the telecommunications industry. In the electronics industry, polyimide compositions are used in applications such as forming protective and stress buffer coatings for semiconductors, dielectric layers for multilayer integrated circuits and multi-chip modules, high temperature solder masks, bonding layers for multilayer circuits, final passivating coatings on electronic devices, and the like. In addition, polyimide compositions may form dielectric films in electrical and electronic devices such as motors, capacitors, semiconductors, printed circuit boards and other packaging structures. Polyimide compositions may also serve as an interlayer dielectric in both semiconductors and thin film multichip modules. The low dielectric constant, low stress, high modulus, and inherent ductility of polyimide compositions make them well suited for these multiple layer applications. Other uses for polyimide compositions include alignment and/or dielectric layers for displays, and as a structural layer in micromachining applications.

Furthermore, in the aerospace industry, polyimide compositions are used for optical applications as membrane reflectors and the like. In application, a polyimide composition is secured by a metal (often aluminum, copper, or stainless steel) or composite (often graphite/epoxy or fiberglass) mounting ring that secures the border of the polyimide compositions. Such optical applications may be used in space, where the polyimide compositions and the mounting ring are subject to repeated and drastic heating and cooling cycles in orbit as the structure is exposed to alternating periods of sunlight and shade.

Polyimide compositions may be synthesized by a number of methods that are known in the art. Exemplary of such methods is the traditional two-step method of synthesizing polyimide compositions, in which a solution of the aromatic diamine in a polar solvent, such as, but not limited to, N-methylpyrrolidone (NMP), is prepared. To this solution a tetracarboxylic acid, usually in the form of a dianhydride, is added. The diamine and the tetracarboxylic acid are generally added in a 1:1 molar stoichiometry, although other stoichiometries may be used. The resulting polycondensation reaction forms a poly(amic acid). The high molecular weight poly(amic acid) acid produced is soluble in the reaction solvent and, therefore, the solution may be cast into a film on a suitable substrate, such as by spin casting, or processed in other ways to produce the final polyimide composition. One common form of polyimide compositions is a polyimide film or membrane. The polyimide film may be produced by casting the soluble poly(amic acid) produced onto a substrate. The cast film is then further processed to remove the solvent and/or to convert the amic acid functional groups to imides with a cyclodehydration reaction, also called imidization.

Several methods are known in the prior art for accomplishing the imidization reaction. In one method, the cast film is heated, generally in stages, to elevated temperatures to remove solvent and accomplish imidization. Alternatively, some poly(amic acids) may be converted in solution to soluble polyimides by using a chemical dehydrating agent, catalyst, and/or heat. Other methods may also be used in certain cases.

During the imidization process, the amic acid functional groups on the poly(amic acid) undergo a chemical conversion to the imide groups in the polyimide. This conversion can impact the nature of the polyimide compositions. Poly(amic acid) compositions have more conformational freedom than their corresponding polyimide compositions. Therefore, during imidization, the conformational freedom of the constituents of the polyimide compositions is reduced. In addition, significant quantities of solvent may also be removed which can cause a reduction in conformational freedom and reduction in volume of the resulting compositions. In certain cases, soluble polyimide compositions may also be used to prepare a polyimide workpiece, such as a polyimide film. The polyimide film may be produced by casting the soluble polyimide onto a substrate. The cast film is then further processed to remove the solvent. During processing, the solvent removal causes a significant stress to accumulate as discussed above.

These changes, either alone or in combination with each other and/or other factors, causes a significant stress to accumulate in the produced polyimide compositions. The amount of accumulated stress is dependent in part on the chemical characteristics of the poly(amic acid) and the resulting polyimide compositions, on the amount of solvent present in the poly(amic acid) solution, the amount of solvent removed during processing and on the physical characteristics of the resulting polyimide compositions, such as but not limited to, size and thickness. For rigid, low CTE polyimide compositions, the difference in conformational freedom is quite significant. As a general rule, the lower the CTE of the polyimide compositions within a copolymer family, the more stress buildup occurs during further processing.

In traditional methods of casting polymer compositions (including films), such as but not limited to polyimide compositions, the poly(amic acid) solution is in contact with the substrate on which the poly(amic acid) solution is cast and is not capable of sufficient movement to release the accumulated stress as the imidization and/or solvent removal processes occurs. As such, as the poly(amic acid) compositions undergo the conformational changes as a result of imidization and/or solvent removal, the forming polyimide compositions are unable to release such accumulated stress without damaging the final product (i.e., the workpiece). The release of accumulated stress is a particular problem with polymer compositions, such as but not limited to, polyimide compositions, having a thickness of about 0.8 mils or greater.

A number of methods have been used to address the issue of substrate adherence in relation to polyimide compositions. For example, release interface agents have been used. The release interface agents are applied to the substrate prior to the addition of the polyimide or poly(amic acid) solution. The release interface agents thereby form a layer between the polyimide or poly(amic acid) solution and the substrate. While effective at providing enhanced release from the substrate, in many cases the release interface agent transfers to the final workpiece producing a workpiece that is hazy or cloudy (such modifications may result in the workpiece being unsuitable for use). Additionally, in many cases, use of the release interface agents results in polyimide films that self-release from the substrate during cure due to the stress accumulation. In many cases, this self-release phenomenon is not desirable and results in the deformation of the workpiece.

The accumulated stress may result in processing-related defects in the final polymer workpiece as discussed. Such processing-related defects include, but are not limited to, cracking, tearing, curling, warping, and mechanical anisotropy (having properties that differ according to the direction of measurement). Such processing-related defects can render the polymer workpiece unsuitable for the use for which it was originally intended.

While the discussion and examples of the present disclosure center on poly(amic acid) and/or polyimide compositions and the problems associated with manufacturing poly(amic acid) and/or polyimide workpieces, similar problems are known in the manufacture of other compositions, in particular, chemical compositions and polymer compositions, and the teachings of the present disclosure should not be limited to polyimide compositions.

Therefore, the art is lacking a method for the preparation of compositions and/or workpieces, such as, but not limited to, poly(amic acid)/polyimide compositions and/or workpieces, that addresses the problems noted in the art. The present disclosure provides a novel method useful in preparing a variety of compositions and/or workpieces, such as, but not limited to, poly(amic acid)/polyimide compositions and/or workpieces, that addresses the problems of processing-related defects, such as, but not limited to, in the case of poly(amic acid)/polyimide compositions and/or workpieces, transformation-related defects and substrate retention-related defects. As a result, the use of the methods of the present disclosure provides compositions and/or workpieces that show reduced processing-related defects, are more consistent in chemical and physical properties and are cheaper and more economical to produce (since less product is rejected as unsuitable). Furthermore, the use of the methods of the present disclosure allows a wider variety of compositions and/or workpieces to be produced using a wider variety of starting materials. With reference to poly(amic acid)/polyimide compositions and/or workpieces, the present disclosure allows a wider variety of polyimide and poly(amic acid) solutions to be utilized and a corresponding wider variety of polyimide compositions to be produced.

DETAILED DESCRIPTION

Definitions

Figure 1:
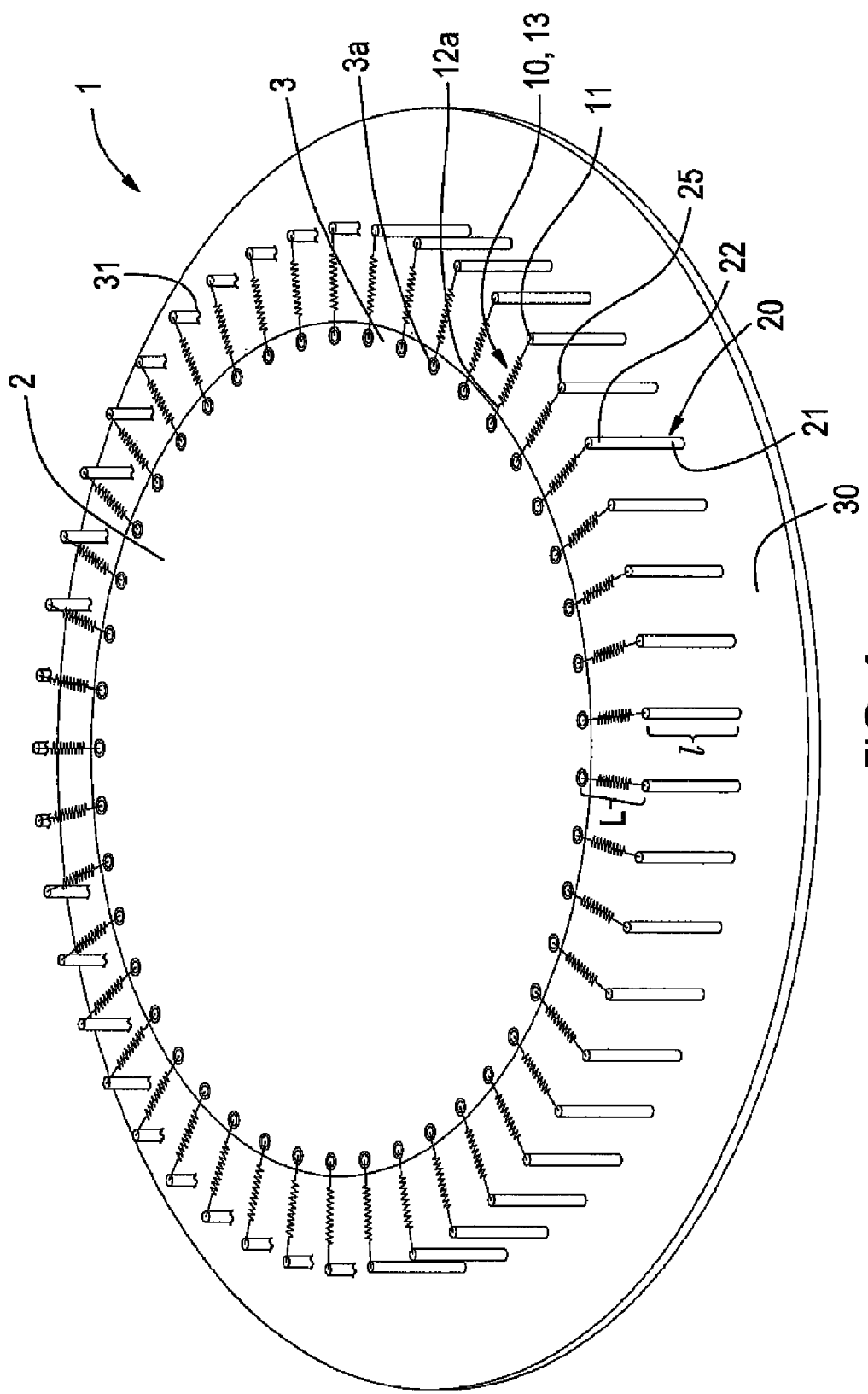
FIG. 1 shows an exemplary suspension device for use with the methods of the present disclosure.

As used herein, the term "processing-related defect" means any defect that results, in whole or in part, from the processing of a workpiece from a first form to a second form; in a specific case when the workpiece is a polyimide or poly(amic acid) workpiece and processing-related defects include, but are not limited to, transformation-related defects and substrate retention-related defects.

As used herein, the term "transformation-related defect" means any defect that results, in whole or in part, from reductions in conformational freedom of one or more components of the workpiece associated with the processing of the workpiece; in the cases where the workpiece is a polyimide or poly(amic acid) workpiece, such reductions in conformational freedom may be due, in whole or in part, to the imidization process and/or the solvent removal process. Manifestations of a transformation related defect include, but are not limited to, cracking, tearing, curling, warping, and mechanical anisotropy of the workpiece.

As used herein, the term "substrate retention-related defects" means any defect that results, in whole or in part, from removing a workpiece from a substrate and/or the use of release interface agents with a workpiece; manifestations of substrate retention related defects include, but are not limited to, cracking and tearing of the workpiece, inability to remove the workpiece from the substrate, and defects associated with ancillary agents used to aid in the removal of the workpiece from the substrate, such as, but not limited to, haziness, cloudiness, and product deformation.

As used herein, the term "thick" when used in reference to the thickness of a polymer composition and/or workpiece means, unless explicitly stated otherwise herein, a film having a thickness of about 0.8 mils or greater.

As used herein, the term "thickness" means the dimension through an object from one side to another, as opposed to its length or width.

As used herein the term "approximately" or "about" in reference to a number is taken to include numbers that fall within a range of 5% in either direction of (i.e., greater than or less than) the number unless otherwise stated or otherwise evident from the context (except where such number would exceed 100% of a possible value).

As used herein, the term "suspended", "suspending" or "suspension" in reference to a composition and/or workpiece, such as a poly(amic acid)/polyimide composition and/or workpiece, means that the workpiece is not in contact with an object on any of its surfaces except as may be required for being secured to a suspension device.

Methods of Manufacture

The present disclosure provides for methods of manufacturing a composition and/or workpiece, such as but not limited to, a poly(amic acid)/polyimide composition/workpiece.

As discussed above, the method of manufacture is particularly suited to compositions/workpieces that undergo a transformation between a first state and a second state at some point in the manufacture and/or processing of the composition/workpiece. In many cases, the transformation is associated with the introduction of stresses that impart processing-related defects to the composition. For some poly(amic acid) compositions/workpieces, the transformation between a first state and a second state is the transformation between the poly(amic acid) state and the polyimide state (the polyimide state is the state of the finished workpiece); this transformation involves, but is not limited to, imidization and/or solvent removal. For polyimide compositions/workpieces, the transformation between a first state and a second state is the transformation between the soluble polyimide and the polyimide formed by removing the solvent; this transformation involves, but is not limited to, solvent removal.

The method of the present disclosure are applicable to any composition/workpiece, such as, but not limited to, a poly(amic acid)/polyimide composition/workpiece that is currently known or discovered hereafter and any method of manufacturing such composition/workpiece, including, but not limited to, the use of any polyimide composition or poly(amic acid) solution that may be used in conjunction with the present disclosure. The produced composition/workpiece is free of or has reduced processing-related defects. In a specific application, the produced poly(amic acid)/polyimide composition/workpiece is free of or has reduced processing-related defects, such as, but not limited to, transformation-related defects and substrate retention-related defects.

The present disclosure provides a description of the use of the methods in conjunction with the production of a poly(amic acid)/polyimide composition/workpiece. However, the methods described and the teachings of the disclosure are useful in the manufacture of other compositions/workpieces as well, in particular chemical and polymer compositions/workpieces. Therefore, the methods and teachings of the present disclosure should not be limited to use with poly(amic acid)/polyimide compositions/workpieces.

In one embodiment, the method of manufacture comprises (i) providing an unfinished workpiece for processing, which may be a poly(amic acid) or polyimide workpiece; (ii) suspending the workpiece so that the workpiece is suspended during processing; and (iii) subjecting the suspended workpiece to processing (which may include, but are not limited to, imidization and/or solvent removal in the case of poly(amic acid) and/or polyimide workpieces) to produce a finished workpiece that is free from or has reduced processing-related defects, such as, but not limited to, transformation-related defects and substrate retention-related defects.

In general, the unfinished workpiece may be provided by (i) selecting the components to produce a desired workpiece/composition to be manufactured; (ii) reacting the selected components to produce a solution; (iii) processing the resulting solution to produce the unfinished workpiece. In one embodiment, the workpiece is a poly(amic acid) or polyimide workpiece. The poly(amic acid) or polyimide workpiece may be provided by (i) selecting the components to produce a desired polyimide composition to be manufactured (generally a diamine and a dianhydride, but may also include polyimide powders); (ii) reacting the selected components to produce a poly(amic acid) or polyimide solution; (iii) processing the resulting solution to produce the poly(amic acid)/polyimide workpiece. In one embodiment, such processing includes casting the solution on a substrate and allowing the solution to air-dry; other processing steps may also be used. Such steps are known in the art and discussed in more detail herein.

The suspension of the workpiece allows the release of accumulated stress that is introduced by the reduction in conformational freedom as a result of the processing as well as prevents damage due to substrate retention. For poly(amic acid)/polyimide workpieces, the processing may include, but is not limited to, imidization and/or the solvent removal. It should be noted that the present disclosure does not require all such stress to be released; a partial reduction in such stress is beneficial. Because the poly(amic acid)/polyimide workpiece (or other workpiece) is suspended during processing additional freedom is provided to the workpiece during processing such that the workpiece is free to dissipate such stress. Furthermore, since the workpiece is not in contact with a substrate, stresses relating to the movement of the workpiece against the substrate are eliminated. As a result, the polyimide/poly(amic acid) workpiece exhibits reduced or no processing-related defects, such as, but not limited to, transformation-related defects and substrate retention-related defects. By allowing the accumulated stress to be dissipated during the processing, a wider variety of polyimide compositions/workpieces may be fabricated without the introduction of processing-related defects and a wider variety of starting materials may be used to produce the poly(amic acid)/polyimide workpieces. In a specific application, the methods of the present disclosure allow for the production of thick workpieces, such as, but not limited to, poly(amic acid)/polyimide workpieces, that are free from or exhibit a reduction in processing-related defects.

The poly(amic acid)/polyimide workpiece or other polymer workpiece may be generated from any combination reagents that are known in the field. In a specific embodiment, the polyimide composition/workpiece is a combination of at least one diamine and at least one dianhydride component. The at least one diamine and dianhydride components may be any diamine or dianhydride components that are known in the art. Exemplary diamine components include, but are not limited to, 4,4'-oxydianiline (4,4'-ODA), 3,4'-oxydianiline (3,4'-ODA), 3,3'-oxydianiline (3,3'-ODA), p-phenylenediamine (p-PDA), m-phenylenediamine (m-PDA), o-phenylenediamine (o-PDA), diaminobenzanilide (DABA), 3,5-diaminobenzoic acid, 3,3'-diaminodiphenylsulfone (3,3'-DDSO$_2$), 4,4'-diaminodiphenyl sulfones, 1,3-bis-(4-aminophenoxy)benzene (APB-134), 1,3-bis-(3-aminophenoxy)benzene (APB-133), 1,4-bis-(4-aminophenoxy)benzene, 1,4-bis-(3-aminophenoxy)benzene, 2,2-Bis[4-(4-aminophenoxy)phenyl]-hexafluoropropane 2,2-bis(3-aminophenyl) 1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl]sulfones (BAPS), 2,2-bis[4-(3-aminophenoxy)phenyl]sulfones (m-BAPS), bis(4-[4-aminophenoxy]phenyl]ether (BAPE), 2,2'-bis-(4-aminophenyl)-hexafluoropropane (BDAF), (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone (DDS), 3,4' diaminodiphenyl ether, 4,4'-diaminodiphenyl ether, 2,6-diaminopyridine, bis(3-aminophenyl)diethyl silane, 4,4'-diaminodiphenyl diethyl silane, benzidine, 3,3'-dichlorobenzidine, 3,3'-dimethoxybenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-aminophenyl-3-aminobenzoate, N,N-bis(4-aminophenyl)aniline, bis(p-beta-amino-t-butylphenyl)ether, p-bis-2-(2-methyl-4-aminopentyl)benzene, p-bis (1,1- dimethyl-5-aminopentyl)benzene, 1,3-bis(4-aminophenoxy) benzene, m-xylylenediamine, p-xylylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal polybutyleneoxides, 4,4'-Methylenebis(2-methylcyclohexylamine), adipic acid, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-methylenebisbenzenamine (MDA), or combinations thereof.

Exemplary dianhydride components include, but are not limited to, hydroquinone dianhydride (HQDA), 3,3',4,4'-biphenyl tetracarboxylic dianhydride (sBPDA), pyromellitic dianhydride (PMDA), 3,3',4,4'-benzophenone tetracarboxylic dianhydride (BTDA), 4,4'-oxydiphthalic anhydride (ODPA), 3,3',4,4'-diphenylsulfone tetracarboxylic dianhydride (DSDA), 4,4'-(4,4'-isopropylidenediphenoxy)bis(phthalic anhydride) (BPADA), 2,2-bis(3,4-dicarboxyphenyl) propane dianhydride, 4,4'-(hexafluoroisopropylidene) diphthalic anhydride (6FDA), bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetracarboxylic dianhydride, 3,3',4,4'-benzophenonetetracarboxylic dianhydride, naphthalene-2,3,6,7-tetracarboxylic dianhydride, naphthalene-1,4,5,8-tetracarboxylic dianhydride, 4,4'-oxydiphthalic dianhydride, 3,3',4,4'-biphenylsulfone tetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl)hexafluoropropane, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-8,9,10-tetracarboxylic dianhydride, pyrazine-2,3,5,6-tetracarboxylic dianhydride, benzene-1,2,3,4-tetracarboxylic dianhydride, thiophene-2,3,4,5-tetracarboxylic dianhydride, or combinations of the foregoing.

In one embodiment, the diamine and dianhydride compositions are those described in PCT application No. PCT/US2006/29805, which is incorporated by reference herein in its entirety. Additional dianhydride and diamine components are listed in "Polyimides Fundamentals and Applications", Marcel Dekker, Inc. (1996), which is hereby incorporated by reference in its entirety.

The polyimide compositions may be prepared as is generally known in the art (for example, see U.S. Pat. Nos. 3,179,630 and 3,179,634, "Polyimides-Thermally Stable Polymers", Plenum Publishing (1987), and "Synthesis and Characterization of Thermosetting polyimide Oligomers for Microelectronics Packaging, Dunson D. L., (Dissertation submitted to faculty of the Virginia Polytechnic Institute and State University, Apr. 21, 2000). Each of the foregoing references is incorporated by reference herein in their entirety.

In one embodiment, the diamine component(s) is dissolved in a suitable solvent and the dianhydride component(s) is added to the solution. A variety of solvents and co-solvents may be used. Suitable solvents include, but are not limited to, polar organic solvents. Exemplary solvents include, but are not limited, dimethylsulfoxide, diethylsulfoxide, N,N-dimethylformamide, N,N-diethylformamide, N,N-dimethylacetamide, N,N-diethylacetamide, N-methyl-2-pyrrolidone, N-cyclohexyl-2-pyrrolidone, 1,3-dimethyl-2-imidazolidinone, diethyleneglycoldimethoxyether, o-dichlorobenzene, m-dichlorobenzene, p-dichlorobenzene, phenols, cresols, xylenol, catechol, butyrolactones, hexamethylphosphoramide, diacetylacetone, and mixtures thereof. In one embodiment the solvents are N,N-dimethylacetamide or N-methyl-2-pyrrolidone. Exemplary cosolvents include, but are not limited to, benzene, toluenes, xylenes, trimethyl benzenes, methyl acetate, ethyl acetate, propyl acetate, butyl acetate, pentyl acetate, acetone, methyl ethyl ketone, ethyl ethyl ketone, tetrahydrofuran, 1,6-dioxane, and mixtures thereof. Other suitable solvents and cosolvents may be used as is known in the art. The solvents and cosolvents described or known in the art may be used alone or in any combination as mixtures. The resulting solution is agitated under controlled temperature conditions until polymerization of the diamine and dianhydride components is completed. In an alternate embodiment, the dianhydride component(s) may be provided as a dry material in a suitable container and the diamine component(s) may be provided as a solution using a suitable solvent. Once prepared, the diamine solution is introduced in a controlled manner to the dianhydride components. The resulting solution is stirred until all the dianhydride component(s) are in solution. The process may be carried out to minimize the introduction of water into the reaction (which can interfere with the polycondensation reaction between the diamine and the dianhydride). In any case, the result of the reaction is a poly(amic acid) solution, the polyimide precursor. The amount of solvent used can be controlled so that the resulting poly(amic acid) solution is suitable for it intended use as is known in the art.

Once the poly(amic acid) solution is formed, the poly(amic acid) solution may be processed to produce a poly(amic acid) workpiece as is known in the art. Any method of processing may be used. In a specific embodiment, the poly(amic acid) solution is processed to produce a poly(amic acid) workpiece in the form of a film. The poly(amic acid) solution may be diluted before application to the substrate using an appropriate solvent. The solvent may be the same or different than was used in the polycondensation reaction. The degree of dilution impacts the viscosity of the poly(amic acid) solution, which impacts various physical properties, such a, but not limited to, thickness of the poly(amic acid) solution on the substrate (and the resulting thickness of the polyimide workpiece produced). For example, when flow casting is used, solutions of the poly(amic acid) solution may range from about 5 to about 60 percent by weight. The poly(amic acid) solution may be applied using a static or dynamic method. In static methods, the poly(amic acid) solution is applied to a stationary substrate and spread across the surface by spinning the substrate. In dynamic methods, the poly(amic acid) solution is applied to a rotating substrate. In the case of both static and dynamic methods, the spin speed of the substrate is sufficient to produce a coating of the poly(amic acid) solution having a desired thickness. Alternatively, the poly(amic acid) solution can be applied the substrate by other methods, such as, but not limited to, dipping, brushing, casting with a bar, roller-coating, spray-coating, dip-coating, whirler-coating, cascade-coating, or curtain-coating.

In the embodiment where the poly(amic acid) solution is to be processed as a film, the poly(amic acid) solution may be dried, at least partially, to produce a film of uncured poly (amic acid) (i.e., the poly(amic acid) workpiece). In a specific embodiment, the poly(amic acid) solution is allowed to dry in a humidity-controlled chamber for a period of time so that a film is produced that can be handled without damaging the film. Such a period of time may be 1 hour or more; in a specific embodiment, the period of time is 12 hours or more.

In addition, certain soluble polyimides may be provided in a powdered form and re-dissolved in a suitable solvent. Such soluble polyimides include, but are not limited to CP1 (6FDA-BDAF), CP2 (6FDA-APB-133), CP3 (6FDA-3,3'DDSO$_2$), and CORIN (AO resistant polyimide). Once re-dissolved, the polyimide solutions may be processed as discussed above for poly(amic acid) solutions.

The workpiece, in whatever form, is then suspended. The workpiece may be modified for attachment to the suspension device described below. In one embodiment, the workpiece comprises a first receiving point for engaging, reversibly or otherwise, the suspension device, such as through securing mechanism on the attachment elements. As a result, the workpiece may be suspended during processing. In one embodiment, the first receiving point is a hole/opening in the workpiece or simply a section of the workpiece that is engaged by the securing mechanism of the attachment elements. The function of the first receiving point is to engage, reversibly or otherwise, the securing mechanism on the attachment elements; therefore, the form of the first receiving point may be dictated, or may dictate, the form of the securing mechanism. The first receiving point may be distributed along at least a portion of the periphery of the workpiece. The first receiving point may further comprise a reinforcing structure to protect the workpiece from tearing or other damage during suspension. In one application of this embodiment, the reinforcing structure is a grommet or similar device which engages and/or creates a hole/opening as the first receiving point. In an alternate application of this embodiment, the reinforcing structure is a section of material placed over and/or around the first receiving point.

When the reinforcing structure is a grommet of similar device, the grommet may be used to generate a hole/opening that serves as the first receiving point or may be placed in an opening/hole that has been formed and serves as the first receiving point. The grommet aids in protecting the edges of the workpiece from damage. The form of the grommet or other device is not critical to the present disclosure and any grommet or similar device may be used. Various grommets and devices for installing grommets are well known in the art. When the reinforcing structure is a material, the material may be placed on the workpiece to protect the workpiece from damage caused by engagement with the suspension device. The material may be placed around a hole/opening that serves as the first receiving point or the material itself may serve as the first receiving point. Material suitable for such use includes, but is not limited to, commercially available polyimide film, various plastics, cloth material, other polymers, thin metals and alloys and combinations of the foregoing. Furthermore, grommets or similar devices may be used in combination with the material described.

In alternate embodiment, the workpiece may be attached (in one embodiment, the attachment is reversible) to the device for suspension using clamps or similar devices. In such cases, the first receiving point may comprise a reinforcing structure such as a section of material as described above. Alternately, the first receiving point may be used without the reinforcing structure.

The first receiving points are spaced along at least a portion of the periphery of the workpiece; in a particular embodiment, the first receiving points are placed so that the tension and/or force applied to the workpiece are uniformly distributed along the workpiece. In a specific embodiment where the first receiving points are openings/holes, the openings/holes are spaced along at least a portion of the periphery of the workpiece such that the tension and/or force applied to the workpiece are uniformly distributed along the workpiece. For instance when the workpiece is in the form of a circle and four first receiving points are desired, four openings/holes may be placed at the 12, 3, 6 and 9 o-clock positions. Of course, more than four first receiving points may be used in accordance with this embodiment and proper placement of the first receiving points is determined by the number of first receiving points desired. As is obvious, spacing of the first receiving points to evenly distribute the force applied to the workpiece can also be applied to workpieces in shapes other than circular shapes.

After the workpiece is suspended, the workpiece may be subject to processing steps. In the case where the workpiece is a poly(amic acid)/polyimide workpiece, the processing may include, but not be limited to, imidization and solvent removal. Imidization may be accomplished using thermal or chemical means. Heating may also be used to carry out the solvent removal process. Methods for curing polyamic acid are well known in the art. Methods for curing are described in "Synthesis and Characterization of Thermosetting polyimide Oligomers for Microelectronics Packaging" as referenced above. In one embodiment, the polyamic acid is heated at a temperature of about 100 degrees to 300 degrees Celsius. The thermal curing may be carried out in a step-wise or ramped manner if desired. If desired an accelerator may be used, such as, but not limited to, a tertiary amine. After the workpiece is processed, the workpiece is ready for use.

Therefore, the present disclosure provides novel methods of producing a composition/workpiece, such as, but not limited to, polyimide composition/workpiece. Using such methods, the present disclosure provides polyimide compositions/workpieces that have no or reduced processing-related defects, such as, but not limited to, transformation-related defects and/or substrate retention-related defects. In addition, the polyimide compositions/workpieces are more consistent in chemical and physical properties and are cheaper and more economical to produce (since less product is rejected as unsuitable). Furthermore, the use of the methods of the present disclosure allows a wider variety of poly(amic acid) and polyimide solutions to be utilized and a corresponding wider variety of polyimide compositions to be produced.

The above description is applicable to both batch and continuous processing.

Suspension Device

The methods of the present disclosure may be practiced using a variety of devices. Exemplary devices are described in co-pending application serial number U.S. Ser. No. 11/844,722, the disclosure of which is hereby incorporated by reference in its entirety.

However, a specific embodiment of such device is provided herein. FIG. 1 illustrates such a suspension device 1. In this embodiment, the base 30 is illustrated as a circular base constructed from an alloy or metal. The base 30 supports a plurality of attachment elements 20. The attachment elements 20 have a circular main body portion 21. The second end 23 of each main body portion 21 is reversibly received by attachment points 31, which are in this embodiment appropriately sized circular holes in the base 30. The first end 22 of the main body portion 21 is reversibly secured to the first end 11 of the attachment element 10 at second receiving point 25. In this example the attachment element is a constant tension spring 13. The second end 12 of the spring 13 is reversibly secured to the workpiece 2, in this case a polyimide or poly(amic acid) workpiece, at first receiving point 3. In this example, the spring 13 and the support element 20 are manufactured from a metal or alloy. The polyimide or poly(amic acid) workpiece 2 is modified at the first receiving point 3 with a reinforcing structure 3A, illustrated as grommets extending through the workpiece 2 and a material surrounding the first receiving point and the grommet. As shown in FIG. 1, the support elements 20 have an arrangement and a length, l, and the attachment elements 10 (shown as springs 13) have a length, L, such that the workpiece 2 is suspended above the base 30. The only contact of the workpiece 2 occurs at the first receiving point 3 where the attachment elements 10 are reversibly secured to the workpiece 2 as described. The constant tension springs 13 provide a constant force on the workpiece 2 during processing (including, but not limited to, imidization and solvent removal). As a result of the workpiece 2 being suspended during processing, the occurrence of processing-related defects, such as transformation-related defects and substrate retention-related defects, are reduced or eliminated.

Other embodiment of the suspension device 1 are possible, with the foregoing being provided for exemplary purposes only. Modifications to the foregoing which are within the skill on of ordinary skill in the art are considered covered by the present disclosure.

Results

The following results were obtained using the suspension device of the present disclosure. The results are shown for illustrative purposes to demonstrate the teachings of the present disclosure and should not be interpreted to limiting the scope of the present disclosure to the provided examples. In each of the examples, provided, the suspension device was in substantially the same for as described in FIG. 4. The terms film as used in the examples is equivalent to the term workpiece as used above.

Example 1

Preparation of a Thick Polyimide Film from a Homopolymer of pPDA/sBPDA Using the Methods and Devices of the Present Disclosure This example describes the preparation of a 2 mil thick polyimide film from a homopolymer of pPDA/sBPDA using the methods and devices of the present disclosure. Due to the nature of the poly(amic acid) formed by this combination of pPDA/sBDPA, the composition undergoes a substantial amount of shrinkage and conformational change during imidization and solvent removal which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa was added 27.70 g s-BPDA. The flask was sealed and purged with dry nitrogen for 1 hour with gentle agitation from the overhead stir shaft. To a separate 250 mL single-neck round bottom flask were added 10.08 g p-PDA and a magnetic stirbar. The flask was sealed and purged with dry nitrogen for 1 hour as above. 200 g anhydrous N,N-Dimethylacetamide (DMAc) solvent was introduced with a double-tipped needle into the amine-containing flask with a dry nitrogen sparge and vigorous agitation. The amine solution was transferred to the dianhydrides-containing flask with a double tip needle while applying slow stirring from the overhead stir shaft under a dry nitrogen blanket. The solution was allowed to react for an additional 16 hours as the dianhydrides dissolved. The resultant solution is approximately 80,000 centipose (cp) in viscosity at 25 degrees Celsius. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100° C. (1 hour); ramp to 200° C. (1 hour); hold at 200° C. (1 hour); ramp to 300° C. (1 hour); hold at 300° C. (1 hour). The resultant film was flat, free from processing-related defects, approximately 2 mils thick, of uniform thickness across the surface area, and fingernail creasable. The film exhibited 1230 ksi modulus, 46 ksi tensile strength, and 19% elongation at break. These properties were substantially the same when measured at 0 degrees, 45 degrees, and 90 degrees radial configurations.

The methods and devices of the present disclosure successfully allowed the production of a 2 mil thick polyimide film from a homopolymer of pPDA/sBPDA.

Example 2

Unsuccessful Preparation of a Thick Polyimide Film from a Homopolymer of pPDA/sBPDA Using the Methods and Devices of the Prior Art This example describes the preparation of a thick polyimide film from a homopolymer of pPDA/sBPDA using the methods and devices of the prior art. The poly(amic acid) solution was prepared exactly as described in Example 1 and flow cast onto a 12" glass substrate. The poly(amic acid) solution was allowed to air dry overnight in a humidity-controlled chamber to yield a film of uncured poly(amic acid). The uncured poly(amic acid) film was secured to the glass using KAPTON (poly(4,4'-oxydiphenylene-pyromellitimide) tape at the edges of the uncured poly(amic acid) film. The poly(amic acid) coated glass was cured in a forced air oven using a stage curing profile as described in Example 1. As a result of the uncured film being secured to the edges of the glass substrate, the film tore at the tape edges due to the inability of the film to release accumulated stress imparted to the film as the result of the conformational changes introduced as a result of processing (such as, but not limited to, imidization and solvent removal) and formed a buckled and curled film during curing. In addition, the film thickness varied from 1 mil to 4 mils in thickness across the surface area, and the glass was spalled on approximately 20% of the surface area. Such processing-related defects rendered the final polyimide film unsuitable for use.

As is evident, the preparation of a thick polyimide film from a homopolymer of pPDA/sBPDA using the methods and devices of the prior art produces a polyimide film that is not suitable for use. However, as described in Example 1, the preparation of a thick polyimide film from a homopolymer of pPDA/sBPDA using the methods and devices of the present disclosure was easily accomplished and produced a polyimide film suitable for use in a wide variety of applications.

Example 3

Unsuccessful Preparation of a Thick Polyimide Film from a Homopolymer of pPDA/sBPDA Using the Methods and Devices of the Prior Art This example describes the preparation of a thick polyimide film from a homopolymer of pPDA/sBPDA using the methods and devices of the prior art. The poly(amic acid) solution from Example 1 was flow cast onto a 12" glass substrate, and allowed to air dry overnight in a humidity-controlled chamber to yield a film of uncured poly(amic acid). The uncured poly(amic acid) film was secured to the glass using KAPTON (poly(4,4'-oxydiphenylene-pyromellitimide) tape at the edges, and further secured with additional application of ¾" KAPTON (poly(4,4'-oxydiphenylene-pyromellitimide) tape applied towards the inside of the film to provide additional grip of the uncured poly(amic acid) film during cure. The poly(amic acid) coated glass was cured in a forced air oven using a stage curing profile as described in Example 1. The polymer film shattered during cure into pieces approximately 5 mm×5 mm.

As is evident, the preparation of a thick polyimide film from a homopolymer of pPDA/sBPDA using the methods and devices of the prior art produces a polyimide film that is not suitable for use. However, as described in Example 1, the preparation of a thick polyimide film from a homopolymer of pPDA/sBPDA using the methods and devices of the present disclosure was easily accomplished and produced a polyimide film suitable for use in a wide variety of applications.

Example 4

Unsuccessful Preparation of a Thick Polyimide Film from a Homopolymer of pPDA/sBPDA Using the Methods and Devices of the Prior Art This example describes the preparation of a thick polyimide film from a homopolymer of pPDA/sBPDA using the methods and devices of the prior art. The poly(amic acid) solution from Example 1 was flow cast onto a 12" glass substrate, and allowed to air dry overnight in a humidity-controlled chamber to yield a film of uncured poly(amic acid). The uncured poly(amic acid) film was secured to the glass using KAPTON (poly(4,4'-oxydiphenylene-pyromellitimide) tape at the edges, and further secured with additional application of ¾" KAPTON (poly(4,4'-oxydiphenylene-pyromellitimide) tape applied towards the inside of the film to provide additional grip of the polymer film during cure. A separate 12" diameter glass substrate was placed on top of the poly(amic acid) film, and a 12" metal plate was placed on top of the second glass. Three metal weights of 3 kg each were applied to the top of the metal plate, and the entire assembly was cured in a forced air oven using a stage curing profile as described in Example 1. The polymer film shattered during cure into pieces approximately 5 mm×5 mm.

As is evident, the preparation of a thick polyimide film from a homopolymer of pPDA/sBPDA using the methods and devices of the prior art produces a polyimide film that is not suitable for use. However, as described in Example 1, the preparation of a thick polyimide film from a homopolymer of pPDA/sBPDA using the methods and devices of the present disclosure was easily accomplished and produced a polyimide film suitable for use in a wide variety of applications.

Example 5

Successful Preparation of a Thick Polyimide Film from a Copolymer of pPDA/sBPDA-6FDA Using the Methods and Devices of the Present Disclosure This example describes the preparation of a 2 mil thick polyimide film from a copolymer of pPDA/sBPDA-6FDA using the methods and devices of the present disclosure. Due to the nature of the poly(amic acid) formed by this combination of pPDA/sBDPA-6FDA, the composition undergoes a substantial amount of shrinkage and conformational change during processing (including, but not limited to, imidization and solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa were added 14.46 g s-BPDA and 14.56 g 6FDA. The flask was sealed and purged with dry nitrogen for 1 hour with gentle agitation from the overhead stir shaft. To a separate 250 mL single-neck round bottom flask were added 8.77 g p-PDA and a magnetic stirbar. The flask was sealed and purged with dry nitrogen for 1 hour. 200 g anhydrous DMAc solvent was introduced with a double-tipped needle into the amine-containing flask with a dry nitrogen sparge and vigorous agitation. The amine solution was transferred to the dianhydrides-containing flask with a double tip needle while applying slow stirring from the overhead stir shaft under a dry nitrogen blanket. The solution was allowed to react for an additional 16 hours as the dianhydrides dissolved. The resultant solution is approximately 50,000 cp in viscosity at 25° degrees Celsius. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100° C. (1 hour); ramp to 200° C. (1 hour); hold at 200° C. (1 hour); ramp to 300° C. (1 hour); hold at 300° C. (1 hour). The resultant film was flat, free from processing-related defects and damage associated with substrate adherence, approximately 2 mils thick, uniform thickness across the surface area, and fingernail creasable. The film exhibited 640 ksi modulus, 24 ksi tensile strength, and 13% elongation at break. The film exhibited a CTE of 13.2 ppm/K. These properties were substantially the same when measured at 0 degrees, 45 degrees, and 90 degrees radial configurations.

The methods and devices of the present disclosure successfully allowed the production of a 2 mil thick polyimide film from a homopolymer of pPDA/sBPDA-6FDA.

Example 6

Successful Preparation of a Thick Polyimide Film from a Copolymer of pPDA-BDAF/sBPDA Using the Methods and Devices of the Present Disclosure This example describes the preparation of a 2 mil thick polyimide film from a copolymer of pPDA-BDAF/sBPDA using the methods and devices of the present disclosure. Due to the nature of the poly(amic acid) formed by this combination of pPDA-BDAF/sBPDA, the composition undergoes a substantial amount of shrinkage and conformational change during processing (including, but not limited to, imidization and solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa was added 23.00 g s-BPDA. The flask was sealed and purged with dry nitrogen for 1 hour with gentle agitation from the overhead stir shaft. To a separate 250 mL single-neck round bottom flask were added 6.70 g p-PDA, 8.03 g BDAF, and a magnetic stirbar. The flask was sealed and purged with dry nitrogen for 1 hour. 200 g anhydrous DMAc solvent was introduced with a double-tipped needle into the amine-containing flask with a dry nitrogen sparge and vigorous agitation. The amine solution was transferred to the dianhydrides-containing flask with a double tip needle while applying slow stirring from the overhead stir shaft under a dry nitrogen blanket. The solution was allowed to react for an additional 16 hours as the dianhydrides dissolved. The resultant solution is approximately 50,000 cp in viscosity at 25 degrees Celsius. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100° C. (1 hour); ramp to 200° C. (1 hour); hold at 200° C. (1 hour); ramp to 300° C. (1 hour); hold at 300° C. (1 hour). The resultant film was flat, free from processing-related defects and damage associated with substrate adherence, approximately 2 mils thick, uniform thickness across the surface area, and fingernail creasable. The film exhibited 586 ksi modulus, 24 ksi tensile strength, and 40% elongation at break. The film exhibited a CTE of 22.9 ppm/K. These properties were substantially the same when measured at 0 degrees, 45 degrees, and 90 degrees radial configurations.

The methods and devices of the present disclosure successfully allowed the production of a 2 mil thick polyimide film from a homopolymer of pPDA-BDAF/sBPDA.

Example 7

Successful Preparation of a Thick Polyimide Film from a Copolymer of pPDA-BDAF/sBPDA-6FDA Using the Methods and Devices of the Present Disclosure This example describes the preparation of a 2 mil thick polyimide film from a copolymer of pPDA-BDAF/sBPDA-6FDA using the methods and devices of the present disclosure. Due to the nature of the poly(amic acid) formed by this combination of pPDA-BDAF/sBPDA-6FDA, the composition undergoes a substantial amount of shrinkage and conformational change during processing (including, but not limited to, imidization and solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa were added 17.33 g s-BPDA and 6.54 g 6FDA. The flask was sealed and purged with dry nitrogen for 1 hour with gentle agitation from the overhead stir shaft. To a separate 250 mL single-neck round bottom flask were added 6.31 g p-PDA, 7.56 g BDAF, and a magnetic stirbar. The flask was sealed and purged with dry nitrogen for 1 hour. 200 g anhydrous DMAc solvent was introduced with a double-tipped needle into the amine-containing flask with a dry nitrogen sparge and vigorous agitation. The amine solution was transferred to the dianhydrides-containing flask with a double tip needle while applying slow stirring from the overhead stir shaft under a dry nitrogen blanket. The solution was allowed to react for an additional 16 hours as the dianhydrides dissolved. The resultant solution is approximately 50,000 cp in viscosity at 25 degrees Celsius. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100° C. (1 hour); ramp to 200° C. (1 hour); hold at 200° C. (1 hour); ramp to 300° C. (1 hour); hold at 300° C. (1 hour). The resultant film was flat, free from processing-related defects and damage associated with substrate adherence, approximately 2 mils thick, uniform thickness across the surface area, and fingernail creasable. The film exhibited 752 ksi modulus, 28 ksi tensile strength, and 24% elongation at break. The film exhibited a CTE of 13.60 ppm/K. These properties were substantially the same when measured at 0 degrees, 45 degrees, and 90 degrees radial configurations.

The methods and devices of the present disclosure successfully allowed the production of a 2 mil thick polyimide film from a homopolymer of pPDA-BDAF/sBPDA-6FDA.

Example 8

Unsuccessful Preparation of a Thick Polyimide Film from a Copolymer of pPDA-BDAF/sBPDA-6FDA Using the Methods and Devices of the Prior Art This example describes the preparation of a thick polyimide film from a copolymer of pPDA-BDAF/sBPDA-6FDA using the methods and devices of the prior art. The poly(amic acid) solution was prepared exactly as described in Example 7 and flow cast onto a 12" glass substrate, and allowed to air dry overnight in a humidity-controlled chamber to yield a film of uncured poly(amic acid). The uncured poly(amic acid) film was secured to the glass using KAPTON (poly(4,4'-oxy-diphenylene-pyromellitimide) tape at the edges of the uncured poly(amic acid) film. The assembly was cured in a forced air oven using a stage curing profile as described in Example 7. As a result of the uncured film being secured to the edges of the glass substrate, the film tore at the tape edges due to the inability of the film to release accumulated stress imparted to the film as the result of the conformational changes introduced as a result of processing (including, but not limited to, imidization and solvent removal) and formed a buckled and curled film during curing. In addition, the film thickness varied from 1 mil to 4 mils in thickness across the surface area, and the glass was spalled on approximately 20% of the surface area. Such processing-related defects rendered the final polyimide film unsuitable for use.

As is evident, the preparation of a thick polyimide film from a copolymer of pPDA-BDAF/sBPDA-6FDA using the methods and devices of the prior art produces a polyimide film that is not suitable for use. However, as described in Example 7, the preparation of a thick polyimide film from a copolymer of pPDA-BDAF/sBPDA-6FDA using the methods and devices of the present disclosure was easily accomplished and produced a polyimide film suitable for use in a wide variety of applications.

Example 9

Unsuccessful Preparation of a Thick Polyimide Film from a Copolymer of pPDA-BDAF/sBPDA-6FDA Using the Methods and Devices of the Prior Art This example describes the preparation of a polyimide film from a copolymer of pPDA-BDAF/sBPDA-6FDA using the methods and devices of the prior art. The poly(amic acid) solution was prepared exactly as described in Example 7, but in addition was thinned to 850 cp using anhydrous DMAc. The uncured poly(amic acid) solution was flow cast onto a 12" glass substrate, and allowed to air dry overnight in a humidity-controlled chamber to yield a film of uncured poly (amic acid). The uncured poly(amic acid) film was secured to the glass using KAPTON (poly(4,4'-oxydiphenylene-pyromellitimide) tape at the edges of the uncured poly(amic acid) film. The assembly was cured in a forced air oven using a stage curing profile as described in Example 7. The resultant polyimide film was removed from the glass by immersion in deionized water. The film curled into a tube after release, indicating mechanical anisotropy through the thickness of the film. The film was approximately 0.4 mil thick. Such processing-related defects rendered the final polyimide film unsuitable for use.

As is evident, the preparation of a polyimide film from a copolymer of pPDA-BDAF/sBPDA-6FDA using the methods and devices of the prior art produces a polyimide film that is not suitable for use. However, as described in Example 7, the preparation of a thick polyimide film from a copolymer of pPDA-BDAF/sBPDA-6FDA using the methods and devices of the present disclosure was easily accomplished and produced a polyimide film suitable for use in a wide variety of applications.

Example 10

Successful Preparation of a Thick Polyimide Film from a Homopolymer of ODA/PMDA Using the Methods and Devices of the Present Disclosure This example describes the preparation of a 2 mil thick polyimide film from a homopolymer of ODA/PMDA using the methods and devices of the present disclosure. Due to the nature of the poly(amic acid) formed by this combination of ODA/PMDA, the composition undergoes a substantial amount of shrinkage and conformational change during processing (including, but not limited to, imidization and solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

To a 500 mL three-neck round bottom flask equipped with an overhead stirrer, thermometer, and rubber septa was added 19.75 g PMDA. The flask was sealed and purged with dry nitrogen for 1 hour with gentle agitation from the overhead stir shaft. To a separate 250 mL single-neck round bottom flask was added 19.75 g ODA and a magnetic stirbar. The flask was sealed and purged with dry nitrogen for 1 hour. 212 g anhydrous DMAc solvent was introduced with a double-tipped needle into the amine-containing flask with a dry nitrogen sparge and vigorous agitation. The amine solution was transferred to the dianhydride-containing flask with a double tip needle while applying slow stirring from the overhead stir shaft under a dry nitrogen blanket. The solution was allowed to react for an additional 16 hours as the dianhydride dissolved. The resultant solution is approximately 50,000 cp in viscosity at 25 degrees Celsius. The poly(amic acid) solution was flow cast onto a 12" glass substrate, and allowed to air dry overnight in a humidity-controlled chamber to yield a film of uncured poly(amic acid). The uncured poly(amic acid) film was removed from the glass, and grommets were attached to the poly(amic acid) near the edge. The film was attached to a device of the present disclosure so that the uncured poly(amic acid) film was suspended and not in contact with a substrate. The assembly was cured in a forced air oven using a stage curing profile of 100° C. (1 hour); ramp to 200° C. (1 hour); hold at 200° C. (1 hour); ramp to 300° C. (1 hour); hold at 300° C. (1 hour). The resultant film was flat, free from processing-related defects and damage associated with substrate adherence, approximately 2 mils thick, uniform thickness across the surface area, and fingernail creasable. These properties were substantially the same when measured at 0 degrees, 45 degrees, and 90 degrees radial configurations.

The methods and devices of the present disclosure successfully allowed the production of a 2 mil thick polyimide film from a homopolymer of ODA/PMDA.

Example 11

Successful Preparation of a Thick 6FDA-BDAF Polyimide Film Using the Methods and Devices of the Present Disclosure This example describes the preparation of a 2 mil thick polyimide film produced from 6FDA-BDAF powder using the methods and devices of the present disclosure. 6FDA-BDAF is a NASA-designed soluble polyimide polymer that is essentially colorless and offers improved space UV-radiation resistance than most known polymer materials (including other polyimides, polyesters, Teflon, teflon-based materials, and others). Due to the nature of the polyimide formed, the composition undergoes a substantial amount of shrinkage and conformational change during processing (including, but not limited to solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

Approximately 20.0 6FDA-BDAF polyimide powder was dissolved into 80.00 g diglyme (diethylene glycol dimethyl ether) with gentle agitation to form a polymer solution approximately 40,000 cp in viscosity. The 6FDA-BDAF solution was flow cast onto a 12" glass substrate, and allowed to air dry overnight in a humidity-controlled chamber to yield an uncured film of 6FDA-BDAF. The uncured 6FDA-BDAF film was removed from the glass, and grommets were attached to the film near the edge. The film was attached to a device of the present disclosure so that the uncured polyimide film was suspended and not in contact with a substrate. The assembly was cured in a forced air oven using a stage curing profile of 100° C. (1 hour); ramp to 200° C. (1 hour); hold at 200° C. (1 hour); ramp to 280° C. (1 hour); hold at 280° C. (1 hour). The resultant film was flat, free from processing-related defects and damage associated with substrate adherence, approximately 2 mils thick, uniform thickness across the surface area, and fingernail creasable. The film exhibited 315 ksi modulus, 14 ksi tensile strength, and 20% elongation at break. The film exhibited a CTE of 49.1 ppm/K. These properties were substantially the same when measured at 0 degrees, 45 degrees, and 90 degrees radial configurations.

The methods and devices of the present disclosure successfully allowed the production of a 2 mil thick polyimide film from a 6FDA-BDAF powder.

Example 12

Unsuccessful Preparation of a Thick 6FDA-BDAF Polyimide Film Using the Methods and Devices of the of the Prior Art This example describes the preparation of a thick 6FDA-BDAF polyimide film from a using the methods and devices of the prior art. The polyimide solution was prepared exactly as described in Example 11 and was flow cast onto a 12" glass substrate. The polyimide solution was allowed to air dry overnight in a humidity-controlled chamber to yield a film of uncured 6FDA-BDAF. The uncured 6FDA-BDAF film was secured to the glass using KAPTON (poly(4,4'-oxydiphenylene-pyromellitimide) tape at the edges. The 6FDA-BDAF-coated glass was cured in a forced air oven using a stage curing profile as described in Example 11. As a result of the uncured film being secured to the edges of the glass substrate, the film tore at the tape edges due to the inability of the film to release accumulated stress imparted to the film as the result of the conformational changes introduced as a result of processing (including, but not limited to, solvent removal) and formed a buckled and curled film during curing. In addition, the film thickness varied from 1 mil to 3 mils in thickness across the surface area, and the glass was spalled on approximately 10% of the surface area.

As is evident, the preparation of a thick polyimide film from a 6FDA-BDAF powder using the methods and devices of the prior art produces a polyimide film that is not suitable for use. However, as described in Example 11, the preparation of a thick polyimide film from a 6FDA-BDAF powder using the methods and devices of the present disclosure was easily accomplished and produced a polyimide film suitable for use in a wide variety of applications.

Example 13

Successful Preparation of a Black, Thick 6FDA-BDAF Polyimide Film Using the Methods and Devices of the Present Disclosure This example describes the preparation of a 4 mil thick, black polyimide film produced from 6FDA-BDAF powder using the methods and devices of the present disclosure. Due to the nature of the polyimide formed, the composition undergoes a substantial amount of shrinkage and conformational change during processing (including, but not limited to, solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

Approximately 46.5 g 6FDA-BDAF polyimide powder was dissolved into 263.5 g diglyme with gentle agitation to form a polymer solution approximately 4,000 cp in viscosity. To this solution were added 5.35 g carbon black and 5.35 g dispersant aid. This formula was mixed with a media mill for 12 hours. The resultant formulation was flow cast onto a glass substrate and allowed to air dry eight hours in a humidity-controlled chamber to yield a film of uncured black 6FDA-BDAF. The uncured black 6FDA-BDAF film was removed from the glass, and grommets were attached to the film near the edge. The film was attached to a device of the present disclosure so that the uncured polyimide film was suspended and not in contact with a substrate. The assembly was cured in a forced air oven using a stage curing profile of 100° C. (1 hour); ramp to 200° C. (1 hour); hold at 200° C. (1 hour); ramp to 280° C. (1 hour); hold at 280° C. (1 hour). The resultant film was flat, free from processing-related defects and damage associated with substrate adherence, approximately 4 mils thick, uniform thickness across the surface area, and fingernail creasable. The film exhibited 330 ksi modulus, 15 ksi tensile strength, and 10% elongation at break. The film exhibited a CTE of 46.0 ppm/K. These properties were substantially the same when measured at 0 degrees, 45 degrees, and 90 degrees radial configurations.

The methods and devices of the present disclosure successfully allowed the production of a 4 mil thick black polyimide film from a 6FDA-BDAF powder.

Example 14

Successful Preparation of a White, Thick 6FDA-BDAF Polyimide Film Using the Methods and Devices of the Present Disclosure This example describes the preparation of a 2 mil thick, white polyimide film produced from 6FDA-BDAF powder using the methods and devices of the present disclosure. Due to the nature of the polyimide formed, the composition undergoes a substantial amount of shrinkage and conformational change during processing (including, but not limited to, solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

Approximately 40.3 g 6FDA-BDAF polyimide powder was dissolved into 269.7 g diglyme with gentle agitation to form a polymer solution approximately 2,000 cp in viscosity. To this solution were added 40.3 g titanium dioxide powder and 4.03 g dispersant aid. This formula was mixed in a media mill for 2 hours. The resultant formulation was flow cast onto a glass substrate and allowed to air dry eight hours in a humidity-controlled chamber to yield a film of uncured white 6FDA-BDAF. The uncured white 6FDA-BDAF film was removed from the glass, and grommets were attached to the film near the edge. The film was attached to a device of the present disclosure so that the uncured polyimide film was suspended and not in contact with a substrate. The assembly was cured in a forced air oven using a stage curing profile of 100° C. (1 hour); ramp to 200° C. (1 hour); hold at 200° C. (1 hour); ramp to 280° C. (1 hour); hold at 280° C. (1 hour). The resultant film was flat, free from processing-related defects and damage associated with substrate adherence, approximately 2 mils thick and uniform thickness across the surface area. These properties were substantially the same when measured at 0 degrees, 45 degrees, and 90 degrees radial configurations.

The methods and devices of the present disclosure successfully allowed the production of a 2 mil thick white polyimide film from a 6FDA-BDAF powder.

Example 15

Successful Preparation of a CORIN (AO Resistant Polyimide) Polyimide Film Using the Methods and Devices of the Present Disclosure This example describes the preparation of a 0.8 mil thick CORIN (AO resistant polyimide) polyimide film using the methods and devices of the present disclosure. Due to the nature of the polyimide formed, the composition undergoes a substantial amount of shrinkage and conformational change during processing (including, but not limited to, solvent removal) which can lead to processing-related defects in the finished film, such as, but not limited to, transformation-related defects. Such processing-related defects increase in frequency as the thickness of a desired polyimide film increases. The preparation of the polyimide film of this example is provided below.

Approximately 50.0 g of a colorless atomic oxygen resistant polyimide, CORIN (AO resistant polyimide), was dissolved into 300.0 g diglyme with gentle agitation to form a polymer solution approximately 1000 cp in viscosity. The resultant solution was flow cast onto a glass substrate and allowed to air dry eight hours in a humidity-controlled chamber to yield an uncured CORIN (AO resistant polyimide) film. The uncured CORIN (AO resistant polyimide) film was removed from the glass, and grommets were attached to the film near the edge. The film was attached to a device of the present disclosure so that the uncured polyimide film was suspended and not in contact with a substrate. The assembly was cured in a forced air oven using a stage curing profile of 100° C. (1 hour); ramp to 200° C. (1 hour); hold at 200° C. (1 hour); ramp to 220° C. (1 hour); hold at 220° C. (1 hour). The resultant film was flat, free from processing-related defects and damage associated with substrate adherence, approximately 0.8 mils thick and uniform thickness across the surface area. The film exhibited 350 ksi modulus, 10 ksi tensile strength, and 7% elongation at break. These properties were substantially the same when measured at 0 degrees, 45 degrees, and 90 degrees radial configurations.

The methods and devices of the present disclosure successfully allowed the production of a 0.8 mil thick CORIN (AO resistant polyimide) polyimide film.

Example 16

Unsuccessful Preparation of a Polyimide Film Using the Methods and Devices of the Prior Art This example describes the preparation of CORIN (AO resistant polyimide) polyimide film from a using the methods and devices of the prior art. The polyimide solution was prepared exactly as described in Example 15 and was flow cast onto a glass substrate pretreated with a releasing agent, and allowed to air dry eight hours in a humidity-controlled chamber to yield an uncured CORIN (AO resistant polyimide) film. The uncured CORIN (AO resistant polyimide) film was secured to the glass using KAPTON (poly(4,4'-oxy-diphenylene-pyromellitimide) tape at the edges. The CORIN (AO resistant polyimide)-coated glass was cured in a forced air oven using a stage curing profile as described in Example 15. The film was soaked in deionized water for one week, but did not release from the glass.

As is evident, the preparation of a CORIN (AO resistant polyimide) polyimide film using the methods and devices of the prior art produces a polyimide film that is not releasable from the glass substrate and is therefore not suitable for use. However, as described in Example 15, the preparation of a CORIN (AO resistant polyimide) polyimide film using the methods and devices of the present disclosure was easily accomplished and produced a polyimide film suitable for use in a wide variety of applications.

The foregoing description illustrates and describes the methods and other teachings of the present disclosure. Additionally, the disclosure shows and describes only certain embodiments of the methods and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain best modes known of practicing the methods and other teachings of the present disclosure and to enable others skilled in the art to utilize the teachings of the present disclosure in such, or other, embodiments and with the various modifications required by the particular applications or uses. Accordingly, the methods and other teachings of the present disclosure are not intended to limit the exact embodiments and examples disclosed herein. All references cited herein are incorporated by reference as if fully set forth in this disclosure.

The invention claimed is:

1. A method of manufacturing a finished poly(amic acid) or polyimide workpiece, the method comprising the steps of:
   (a) providing an unfinished poly(amic acid) or polyimide workpiece having an initial surface area, said unfinished workpiece comprising a plurality of receiving points spaced along the periphery of the workpiece;
   (b) suspending the unfinished poly(amic acid) or polyimide workpiece by said receiving points to provide a tension uniformly distributed along the workpiece; and
   (c) processing the suspended unfinished poly(amic acid) or polyimide workpiece by at least one of chemical imidization, thermal imidization and solvent removal, under said tension uniformly distributed along the workpiece,
   wherein said tension is provided by said processing, to produce the finished poly(amic acid) or polyimide workpiece,
   wherein the finished poly(amic acid) or polyimide workpiece has a final surface area that is smaller than the initial surface area, and
   wherein the finished poly(amic acid), or polyimide workpiece displays uniform properties in all axes and directions of the finished workpiece.

2. The method of claim 1 where the unfinished poly(amic acid) or polyimide workpiece is provided by:
   (a) selecting at least one component to produce the unfinished poly(amic acid) or polyimide workpiece;
   (b) reacting said components to produce a poly(amic acid) or polyimide solution; and
   (c) processing the poly(amic acid) or polyimide solution to produce the unfinished poly(amic acid) or polyimide workpiece.

3. The method of claim 1 where the finished poly(amic acid) or polyimide workpiece is free from or has reduced processing-related defects.

4. The method of claim 1 where the unfinished poly(amic acid) or polyimide workpiece is in the form of a film or membrane.

5. The method of claim 4 where the film or membrane has a thickness of about 0.8 mils or greater.

6. The method of claim 1 where the finished poly(amic acid) or polyimide workpiece is in the form of a film or membrane.

7. The method of claim 6 where the film or membrane has a thickness of about 0.8 mils or greater.

8. The method of claim 1, where the unfinished poly(amic acid) or polyimide workpiece is suspended from a suspension device, said suspension device comprising at least one support element and at least one attachment element, the at least one attachment element having a first end secured to the poly(amic acid) workpiece and a second end secured to the support element.

9. The method of claim 8 where the attachment element is reversibly secured to at least one of the unfinished poly(amic acid) or polyimide workpiece or the support element.

10. The method of claim 8 where the attachment element is a constant tension spring.

11. The method of claim 8 where the unfinished poly(amic acid) or polyimide workpiece is modified to allow the unfinished poly(amic acid) or polyimide workpiece to be secured to the attachment elements.

12. The method of claim 11 where the unfinished poly(amic acid) or polyimide workpiece is modified by providing an opening in the unfinished poly(amic acid) or polyimide workpiece.

13. The method of claim 12 where the opening comprises a reinforcing structure.

14. The method of claim 13 where the reinforcing structure is a grommet, a section of material or a combination of the foregoing.

15. The method of claim 3 where the processing-related defect renders the finished polyimide workpiece unsuitable for use.

16. The method of claim 3 where the processing-related defects are transformation-related defects or substrate retention-related defects.

17. The method of claim 16 where the transformation-related defect is a cracking, a tearing, a curling, a warping, or a mechanical anisotropy of the workpiece.

18. The method of claim 16 where the substrate-retention related defect is a cracking of the workpiece, a tearing of the workpiece, an inability to remove the workpiece from the substrate, or a defect associated with the use of an ancillary agent used to aid in the removal of the workpiece from the substrate.

19. The method of claim 18 where the ancillary agent is a release interface agent and the defect associated with the use of an ancillary agent is a haziness, a cloudiness, or a product deformation.

20. The method of claim 1 where the suspending dissipates at least a portion of a stress that is generated during processing.

21. The method of claim 20 where the stress results, at least in part, from a reduction in conformational freedom of the components of the unfinished poly(amic acid) or polyimide workpiece during processing.

22. The method of claim 2 where the at least one component is a dianhydride and a diamine.

23. The method of claim 22 where the dianhydride is selected from the group consisting of hydroquinone dianhydride, 3,3',4,4'-biphenyl tetracarboxylic dianhydride, pyromellitic dianhydride, 3,3',4,4'-benzophenone tetracarboxylic dianhydride, 4,4'-oxydiphthalic anhydride, 3,3',4,4'-diphenylsulfone tetracarboxylic dianhydride, 4,4'-(4,4'-isopropylidenediphenoxy)bis(phthalic anhydride), 2,2-bis(3,4-dicarboxyphenyl) propane dianhydride, 4,4'-(hexafluoroisoproylidene)diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetracarboxylic dianhydride, 3,3',4,4'-benzophenonetetracarboxylic dianhydride, naphthalene-2,3,6,7-tetracarboxylic dianhydride, naphthalene-1,4,5,8-tetracarboxylic dianhydride, 4,4'-oxydiphthalic anhydride, 3,3',4,4'-biphenylsulfone tetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl)hexafluoropropane, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-8,9,10-tetracarboxylic dianhydride, pyrazine-2,3,5,6-tetracarboxylic dianhydride, benzene-1,2,3,4-tetracarboxylic dianhydride, thiophene-2,3,4,5-tetracarboxylic dianhydride or combinations of the foregoing.

24. The method of claim 22 where the diamine is selected from the group consisting of 4,4'-oxydianiline, 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenyl sulfones, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-Bis[4-(4-aminophenoxy)phenyl]-hexafluoropropane, 2,2-bis(3-aminophenyl)-1,1,1,3,3,3-hexafluoropropane, 4,4'-isopropylidenedianiline, 1-(4-aminophenoxy)-3-(3-aminophenoxy)benzene, 1-(4-aminophenoxy)-4-(3-aminophenoxy)benzene, bis-[4-(4-aminophenoxy)phenyl]sulfones, 2,2-bis[4-(3-aminophenoxy)phenyl]sulfones, bis(4-[4-aminophenoxy]phenyl)ether, 2,2'-bis-(4-aminophenyl)-hexafluoropropane, (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone, 3,4'diaminodiphenyl ether, 4,4'-diaminodiphenyl ether, 2,6-diaminopyridine, bis(3-aminophenyl)diethyl silane, 4,4'-diaminodiphenyl diethyl silane, benzidine, 3,3'-dichlorobenzidine, 3,3'-dimethoxybenzidine, 4,4'-diaminobenzophenone, N,N-bis(4-aminophenyl)-n-butylamine, N,N-bis(4-aminophenyl)methylamine, 1,5-diaminonaphthalene, 3,3'-dimethyl-4,4'-diaminobiphenyl, 4-aminophenyl-3-aminobenzoate, N,N-bis(4-aminophenyl)aniline, bis(p-beta-amino-t-butylphenyl) ether, p-bis-2-(2-methyl-4-aminopentyl)benzene, p-bis(1,1-dimethyl-5-aminopentyl)benzene, 1,3-bis(4-aminophenoxy)benzene, m-xylylenediamine, p-xylylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal polybutyleneoxides, 4,4'-Methylenebis(2-methylcyclohexylamine), adipic acid, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-methylenebisbenzenamine, or combinations of the foregoing.

25. The method of claim 2 where the at least one component is 6FDA-BDAF, 6FDA-APB-133, 6FDA-3,3'DDSO$_2$, or AO resistant polyimide.

* * * * *